United States Patent
Graham et al.

(10) Patent No.: US 9,473,438 B1
(45) Date of Patent: Oct. 18, 2016

(54) SYSTEM FOR ANALYZING EMAIL FOR COMPLIANCE WITH RULES

(71) Applicant: OTC Systems Ltd., London (CA)

(72) Inventors: Timothy Scott Graham, London (CA); Christopher R. Stainton, London (CA)

(73) Assignee: OTC SYSTEMS LTD., London, Ontario (CA)

( * ) Notice: Subject to any disclaimer, the term of this patent is extended or adjusted under 35 U.S.C. 154(b) by 0 days.

(21) Appl. No.: 15/165,652

(22) Filed: May 26, 2016

Related U.S. Application Data

(60) Provisional application No. 62/167,004, filed on May 27, 2015.

(51) Int. Cl.
*G06F 15/16* (2006.01)
*H04L 12/58* (2006.01)
*H04W 88/02* (2009.01)
*G06F 17/30* (2006.01)

(52) U.S. Cl.
CPC ......... *H04L 51/12* (2013.01); *G06F 17/30097* (2013.01); *H04W 88/02* (2013.01)

(58) Field of Classification Search
CPC . H04L 51/12; H04L 63/0263; G06Q 10/107; G06Q 10/10
See application file for complete search history.

(56) References Cited

U.S. PATENT DOCUMENTS

| | | | |
|---|---|---|---|
| 7,660,865 B2 | 2/2010 | Hulten et al. | |
| 8,353,035 B1 | 1/2013 | Coomer et al. | |
| 2003/0041126 A1 | 2/2003 | Buford et al. | |
| 2003/0172294 A1 | 9/2003 | Judge | |
| 2004/0083270 A1 | 4/2004 | Heckerman et al. | |
| 2005/0154601 A1 | 7/2005 | Halpern et al. | |
| 2006/0095966 A1 | 5/2006 | Park | |
| 2009/0132669 A1 | 5/2009 | Milliken et al. | |
| 2009/0282112 A1 | 11/2009 | Prakash | |
| 2011/0055332 A1 | 3/2011 | Stein | |
| 2011/0289169 A1* | 11/2011 | Lee | G06Q 10/107 709/206 |
| 2013/0325980 A1* | 12/2013 | Ohayon | H04L 51/066 709/206 |

* cited by examiner

*Primary Examiner* — Yves Dalencourt
(74) *Attorney, Agent, or Firm* — Kagen Binder, PLLC

(57) ABSTRACT

A system for analyzing email for compliance with a set of rules, including enhanced email devices configured to determine whether an email message probably conforms or does not conform to the rules. If the email message is determined to probably not conform to the rules, designate the email message to be a probable non-conforming email (NCE), and electronically transmit a reporting message to a server containing a copy of the probable NCE, user-identifying information, and reasons for probable non-conformance. The server is configured to receive the reporting messages and, for each probable NCE, calculate a digital signature of the probable NCE. If the probable NCE is not stored in the NCE database, the server stores the probable NCE and the signature in the NCE database along with the user-identifying information and the reasons for non-conformance. Otherwise, it adds the user-identifying information and the non-conformance reasons record in the NCE database.

14 Claims, 1 Drawing Sheet

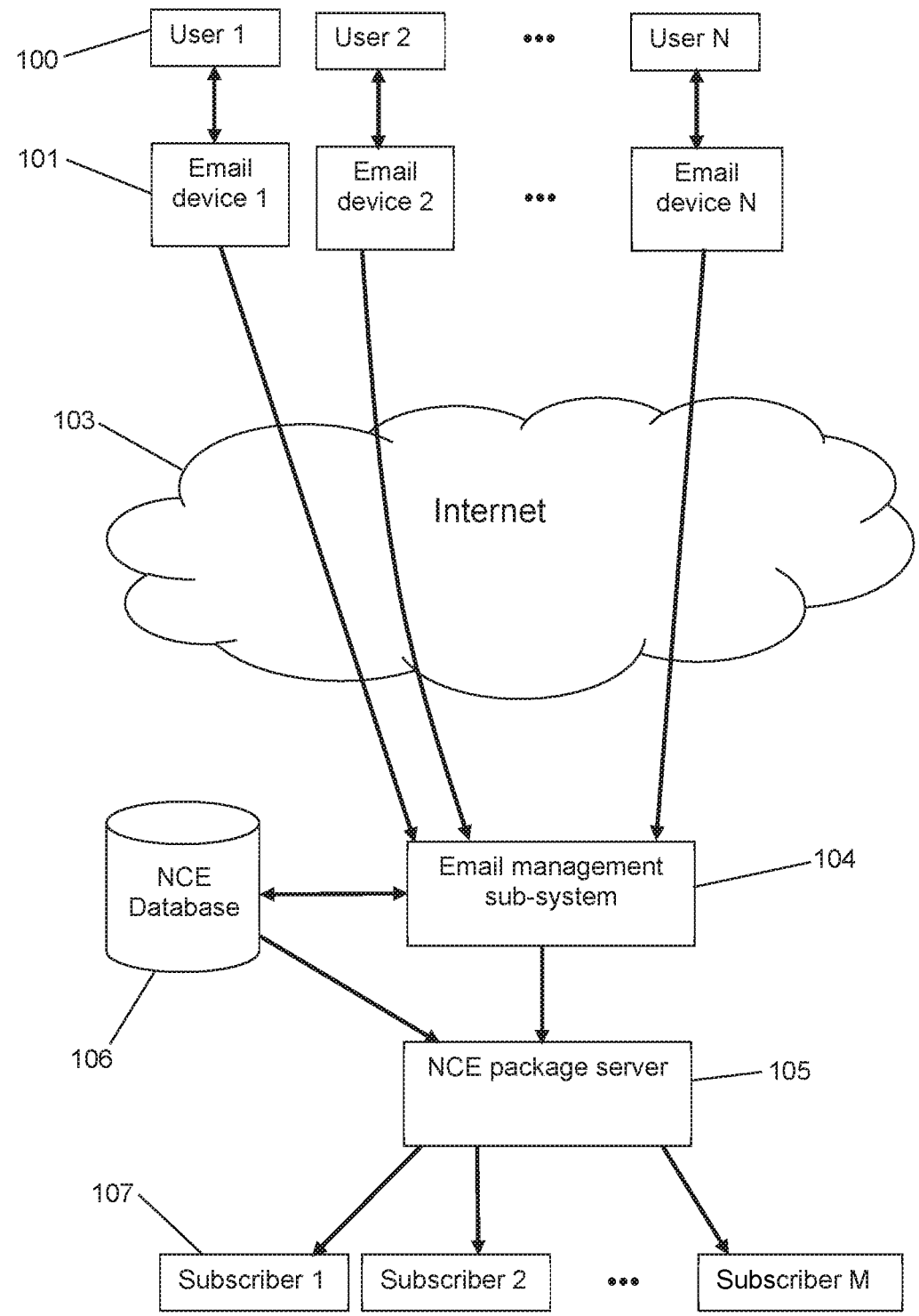

SYSTEM FOR ANALYZING EMAIL FOR COMPLIANCE WITH RULES

PRIORITY CLAIM

The present non provisional patent application claims priority under 35 USC §119(e) from U.S. Provisional patent application having Ser. No. 62/167,004, filed May 27, 2015, entitled "SYSTEM FOR ANALYZING EMAIL FOR COMPLIANCE WITH RULES," the entirety of which is incorporated herein by reference.

FIELD OF THE INVENTION

The present invention relates to system for analyzing electronic messages for compliance with a predefined set of rules.

BACKGROUND OF THE INVENTION

Governments are increasingly regulating the use of email for commercial purposes. For example, Canada's Anti-Spam Legislation (CASL) came into effect in Canada in July 2014. One objective of CASL is to protect Canadians from spam while allowing continued growth for business in the global market. The introduction of this legislation brought about a need for email filtering systems that facilitate a user's (or "sender's") compliance with CASL.

One aspect of CASL that came into effect in July 2014 was that businesses and organizations cannot send commercial electronic messages if they do not have proper consent from the recipient to send the message. The form of consent may vary, but there must at least be implied consent from the recipient to receive a commercial electronic message.

The current penalties for violating the provisions of CASL include a possible financial penalty, per infraction, of $1,000,000 for individuals and $10,000,000 for businesses. As such, businesses and organizations are provided with a significant incentive to ensure their compliance with the new legislation.

Such legislation may also provide private right of action in court against individuals and organizations who have violated the law. The private right of action may allow an applicant, or a class of applicants, to seek actual and/or statutory damages. In the case of CASL, the private right of action comes into force on Jul. 1, 2017. However, individuals may have difficulty determining when a particular email violates the legislation, and even more so determining whether they may be potential participants in a class action based on a private right of action.

SUMMARY OF THE INVENTION

In some embodiments, the invention provides an email management system configured to electronically receive probable non-conforming emails (NCEs) from enhanced email devices. Each NCE has been determined by one of the enhanced email devices to probably not conform to a predefined set of rules. Each NCE is provided to the email management system in a reporting message containing a copy of the probable NCE, user-identifying information, and information specifying one or more reasons for probable non-conformance. The system includes a computer processor configured to perform a number of functions. The computer processor maintains an NCE database storing records for probable NCEs. The record for each probable NCE includes a copy of the probable NCE, and one or more digital signatures of the probable NCE. The computer processor electronically receives the reporting messages from the enhanced email devices. For each probable NCE contained in one of the reporting messages, the computer processor calculates one or more digital signatures of the probable NCE. Then, the computer processor determines by comparing the calculated signatures with the signatures stored in the NCE database whether the probable NCE is already stored in the NCE database. Then, if the probable NCE is not stored in the NCE database, the computer processor stores the probable NCE and the one or more calculated signatures in the NCE database along with the user-identifying information and the information specifying one or more reasons for probable non-conformance contained in the reporting message. Alternatively, if the probable NCE is already stored in the NCE database, the computer processor adds the user-identifying information and the information specifying one or more reasons for probable non-conformance in the reporting message to the record for the probable NCE in the NCE database.

The computer processor may analyze an NCE database record to determine whether each of the probable NCEs is a confirmed NCE that does not conform to the rules. The computer processor may determine that the probable NCE is a confirmed NCE by calculating a score related to the probability that the probable NCE does not conform to the rules, and then the probable NCE is deemed to be a confirmed NCE if the score exceeds a pre-determined threshold. The score may be calculated so that the score exceeds the pre-determined threshold if more than a pre-determined number of enhanced email devices reported the probable NCE with the same reason for probable non-conformance.

If the probable NCE is determined to be a confirmed NCE, the computer processor may prepare a package of information containing the reasons for probable non-conformance and specifying user-identifying information for each user whose enhanced email device reported the confirmed NCE to be a probable NCE. The computer processor of the email management may electronically transmit the package of information to a remote electronic device. The package of information may also include the score for each confirmed NCE.

At least one of the digital signatures of each of the probable NCEs may be the value of a hash function computed on a portion of the probable NCE. At least one of the digital signatures of each of the probable NCEs may be the value of a hash function computed on the complete probable NCE other than message headers.

The predefined set of rules may be derived from legislation limiting the transmission of unsolicited commercial electronic messages so that an NCE represents a breach of the legislation.

The computer processor may analyze multiple NCE database records to analyze, for each NCE database record, the probable NCE and the information specifying the reasons for probable non-conformance to determine whether the probable NCE is a confirmed NCE. The packages of information may be electronically transmitted to a server.

The package of information may include, for each user whose enhanced email device reported the confirmed NCE to be a probable NCE, an indication of whether the user is willing to participate in a class action lawsuit in relation to the confirmed NCE.

Each probable NCE contained in a reporting message may include all message headers.

In other embodiments, the invention provides a system for analyzing email for compliance with a predefined set of rules. The system includes multiple enhanced email devices and an email management system. Each enhanced email device has a computer processor configured to send and receive email, display email to a user, and receive input from the user. The computer processor of the enhanced email device is configured to perform a number of functions. The computer processor of the enhanced email device determines whether an email message received by the email device probably conforms or does not conform to the rules. Then, if the email message is determined to probably not conform to the rules, the computer processor of the enhanced email device designates the email message to be a probable non-conforming email (NCE), and electronically transmits a reporting message to the email management system. The reporting message contains a copy of the probable NCE, user-identifying information, and information specifying one or more reasons for probable non-conformance. The email management system has a computer processor configured to perform a number of functions. The computer processor of the email management system maintains an NCE database storing a record for each of a plurality of probable NCEs. The record for each probable NCE includes a copy of the probable NCE, and one or more digital signatures of the probable NCE. The computer processor of the email management system electronically receives the reporting messages from the plurality of enhanced email devices. For each probable NCE contained in one of the reporting messages, the computer processor of the email management system calculates one or more digital signatures of the probable NCE, and determines by comparing the calculated signatures with the signatures stored in the NCE database whether the probable NCE is already stored in the NCE database. If the probable NCE is not stored in the NCE database, the computer processor of the email management system stores the probable NCE and the one or more calculated signatures in the NCE database along with the user-identifying information and the information specifying one or more reasons for probable non-conformance contained in the reporting message. If the probable NCE is already stored in the NCE database, the computer processor of the email management system adds the user-identifying information and the information specifying one or more reasons for probable non-conformance in the reporting message to the record for the probable NCE in the NCE database.

In other embodiments, the invention provides an enhanced email device having a computer processor and electronic interfaces configured to send and receive email, display email to a user, and receive input from the user. The computer processor is configured to perform a number of functions. The computer processor of the enhanced email device determines whether an email message received by the email device probably conforms or does not conform to the rules. If the email message is determined to probably not conform to the rules, the computer processor of the enhanced email device designates the email message to be a probable non-conforming email (NCE), and electronically transmits a reporting message to an email management system. The reporting message contains a copy of the probable NCE, user-identifying information, and information specifying one or more reasons for probable non-conformance. The computer processor of the enhanced email device may determine whether an email message received by the email device probably conforms or does not conform to the rules by automatically analyzing the email message. The computer processor of the enhanced email device may determine whether an email message received by the enhanced email device probably conforms or does not conform to the rules by receiving input from the user of the enhanced email device. The computer processor of the enhanced email device may present a menu of candidate reasons for non-compliance to the user, and the user may then select one or more of the presented candidate reasons to specify to the computer processor of the enhanced email device that the email probably does not comply with the rules on the basis of the one or more selected candidate reasons. The enhanced email device may be a smartphone running a software application that causes the computer processor of the smartphone to perform the described functions.

BRIEF DESCRIPTION OF THE DRAWINGS

FIG. 1 schematically depicts N enhanced email devices communicating via the internet with an email management system, the an email management system communicating with an NCE database and an NCE package server, and M subscribers accessing the an NCE package server.

DETAILED DESCRIPTION OF THE INVENTION

In the drawings and description that follows, specific embodiments of the present invention are described in detailed and are shown in the drawings with the understanding that the present disclosure is an exemplification of the principles of the invention, and is not intended to limit the invention to what is illustrated and described herein. For example, certain method steps described herein may be performed in a different order to achieve the same result, as will be understood by a skilled artisan.

In some embodiments, the invention is a system for analyzing email ("email analysis system") for compliance with a predefined set of rules. Referring to FIG. 1, the system includes a number of enhanced email devices 101, each being used by a particular user 100, and an email management system 104 that manages a non-conforming email (NCE) database 106.

An email device is device, such as a smart phone, laptop or desktop computer, that is configured to send and receive email, and display email messages to the user of the device, for example on the display screen of a smartphone. The email functionality and user interface are provided by a computer processor in the email device, generally being implemented by software running on a general-purpose computer. Generally the device has a keyboard (which may, for example, be mechanical or displayed on a screen) that can be used by the user 100, under control of the processor, to enter text into email messages. The enhanced email device 101 of the email analysis system is an improvement to the basic email device. The improvement improves the operation of the computer processor by adding functionality to the processor. This is preferably done by software that runs on the computer processor, hut could be done by custom hardware, such as an application-specific integrated circuit (ASIC).

The added functionality involves first determining whether an email message received by the email device probably conforms or does not conform to the rules. Then, if the email message is determined to probably not conform to the rules, the enhanced email device 101 designates the email message to be a probable NCE, and electronically transmits a reporting message to an email management system 104, which is also part of the email analysis system. The reporting message contains a copy of the probable NCE, user-identifying information, and information specifying one or more reasons for probable non-conformance. The copy of the probable NCE in the reporting message may be compressed or may be filtered in some manner, for example to remove certain information, such as the user's email address, from the body of the probable NCE. Preferably though such processing, where deemed necessary, is done by the email management system 104.

By "probably" being an NCE, it is meant that evidence has been identified that indicates the probable NCE may be an actual NCE that does not conform to the rules. No specific probability is required to be determined or estimated.

The probable NCE contained in a reporting message preferably includes all message headers.

The reporting message preferably further includes an indication of whether the user is willing to participate in a class action lawsuit in relation to the probable NCE.

The user-identifying information may include, for example, the user's name, email address, telephone number, home address, and/or a unique user identification code. Where each user has a unique user ID, then information about the user, such as name, address, email address, telephone number and willingness to participate in a class action lawsuit in relation to the probable NCE may be stored in a user database. For example this may be a database maintained by the email management system 104, or a related server. Such information may be obtained and stored when a user first installs the software (or "app") to enhance the user's email device. References to "user-identifying information" herein are intended to include all such user information stored in a database that can be indexed by the user-identifying information contained in a reporting message sent by the user's enhanced email device 101.

The determination of whether an email message received by the email device probably conforms or does not conform to the rules may be done by the processor of the enhanced email device 101 automatically analyzing the email message. Alternatively, this may be done by receiving input from the user of the enhanced email device. For example, the processor of the enhanced email device may present a menu of candidate reasons for non-compliance to the user, and the user then can select one or more of the presented candidate reasons to specify to the processor of the enhanced email device that the email probably does not comply with the rules on the basis of the one or more selected candidate reasons.

The predefined set of rules may be derived from legislation, such as CASL, limiting the transmission of unsolicited commercial electronic messages so that an NCE represents a breach of the legislation. For example, one rule may require an unsubscribe mechanism. The presence of such a mechanism may be assessed, for example, by searching for occurrences of "unsubscribe" or "to be removed" in the email message. Then if no related language is found in the message, that message may be designated a probable NCE for the reason of lacking an unsubscribe mechanism. This indication that an unsubscribe mechanism is not included in the probable NCE is evidence that may support a conclusion that the probable NCE is an actual NCE. Other miles/reasons for probable non-conformance may include, for example, lack of sufficient contact information of the sender.

The email management system 104 has a computer processor configured to maintain an NCE database 106 storing a record for each of a plurality of probable NCEs (some of which may also be confirmed NCEs). The record for each probable NCE includes a copy of the probable NCE, and one or more digital signatures of the probable NCE. The email management system 104 electronically receives the reporting messages from the enhanced email devices 101, for example over the internet 103.

A digital signature is a number (which may be represented as a character string of hexadecimal digits for example) derived from the content of the probable NCE that can be used to identify the particular NCE. For example, a cryptographic hash function such as MD4, MD5, SHA-1 and SHA-2, may be applied to the text in the body of the NCE to produce a hash value that represents one signature. For example, this may be a 160 bit SHA-1 hash value. Ideally the same NCE should always produce the same signature, however this may not be the case even where the same message has been sent to many people if, for example, the email has been customized for each user, or where other variable information is included in the email message. There are known methods for dealing with this issue which have been addressed by developers of spam detection software. One approach to is calculate multiple signatures on multiple portions of the email message content, possibly after filtering the message to remove certain items (such as the user's email address, for example). Then there is still a high degree of confidence that the same NCE has been seen previously if at least one of the signatures of a new message matches one of the signatures of a previously seen NCE.

Digital signatures are generally computed on the text in the body of an email message, excluding all message headers, but could also be based on graphics and attachments to the email. In a simplest example, a hash of the entire content of the email message is calculated as a signature.

For each probable NCE contained in one of the reporting messages, the email management system's processor performs a number of processing functions. First, it calculates one or more digital signatures of the probable NCE, and determines by comparing the calculated signatures with the signatures stored in the NCE database 106 whether the probable NCE is already stored in the NCE database 106. If the probable NCE is not stored in the NCE database 106, then the processor creates a new record in the NCE database 106 and stores the probable NCE and the one or more calculated signatures in the NCE database along with the user-identifying information and the information specifying one or more reasons for probable non-conformance contained in the reporting message.

If the probable NCE is already stored in the NCE database, then the email management system's processor adds the user-identifying information and the information specifying one or more reasons for probable non-conformance in the reporting message to the record for the probable NCE in the NCE database 106. In general all information contained in the reporting message is stored in the NCE database 106, including, if available, an indication of whether the user is willing to participate in a class action lawsuit in relation to the probable NCE, and/or if the user is willing to participate in any process to seek redress based on the reception of the probable NCE.

The processor of the email management system is preferably further configured to analyze NCE database records to, for each record, determine whether the probable NCE is a confirmed NCE that does not conform to the rules. This may be done periodically on all the stored records. Alternatively, it may be re-done for a given NCE database record after that NCE database record has been updated to incorporate information from a new reporting message.

The processor of the email management system may determine that the probable NCE is a "confirmed" NCE by calculating a score related to the probability that the probable NCE does not conform to the rules. Then the probable NCE is deemed to be a confirmed NCE if the score exceeds a pre-determined threshold.

The score may be calculated, for example, so that the score exceeds the pre-determined threshold if more than a pre-determined number of enhanced email devices reported the probable NCE with the same reason for probable non-conformance. For example in a very simple example, the score may just be a either 0 (not confirmed) or 1 (confirmed). Then the score may be set to 1 when the same probable NCE has been reported by 10 different users, for example, in which case the probable NCE is deemed to be a confirmed NCE.

Another example of a score for a given probable NCE is simply the total number of users who have reported the probable NCE for any reason. Another is how many times HREF, IP, company name, phone number, name and other identifying characters appear across multiple messages in the database. The system will also cross-reference MX records to put a name and address to the sending company.

A search of the HREF may be completed to identify last country message was sent from. A secondary TRACE-ROUTE may be performed to provide another level of server location, if the first primary scoring is high enough.

Scores may be weighted to the level of reasonable assurance they provide. For example, if the word "Unsubscribe" does not appear in message, it would be weighted heavily as that is a statutory issue, but the score would be lightened as the words unsubscribe may appear, for example, in a graphic, such as a JPEG or other image, not scanned on first pass, or not loaded from original server. An instance of tens of thousands of reported messages with the same hash, from a server based in Canada, by a company within Canada may be given a higher score.

In some cases, multiple scores may be calculated and stored. For example, a separate score may be calculated for each of a set of reasons for non-conformance, each of which may correspond to one or more of the rules.

The processor of the email management system is preferably further configured to, if the probable NCE is determined to be a confirmed NCE, prepare a package of information containing the reasons for probable non-conformance and specifying user-identifying information for each user whose email device reported the confirmed NCE to be a probable NCE. Other information, such as willingness of each user to participate in a lawsuit in relation to the probable NCE is preferably also included in the NCE package, where available. The score, or scores, for each confirmed NCE is preferably also included in the NCE package.

The processor of the email management system 104 may be further configured to electronically transmit the package of information to a remote electronic device.

The processor of the email management system 104 may be further configured to analyze all of NCE database records and determine which are confirmed NCEs. Then, the packages of information may be electronically transmitted to, or made available to, an NCE package server 105. This may be done, for example, every time the status of a probable NCE is upgraded to be a confirmed NCE, and whenever the database record for a confirmed NCE is modified to add additional information. Alternatively this may be done periodically.

The contents of the NCE package server 105 may then be made available to subscribers 107 who pay for the right to view the NCE packages, preferably including an indication of the willingness of each user to participate in a lawsuit in relation to the confirmed NCE. Such subscribers may be lawyers who use the information in each package to decide whether to initiate a law suit, such as a class action suit on behalf of the users specified in an NCE package who indicated that they are willing to participate in a class action related to the confirmed NCE. Such subscribers would generally be very knowledgeable about the statutory requirements and would first analyze the confirmed NCE in a package to determine that it is an actual NCE before contacting the potential class action participants.

All of the processing described above may be performed by, for example, an application-specific integrated circuit (ASIC) custom designed to implement and embodiment of the invention. Preferably, they are implemented in the form of executable software that runs on a programmable computer processor and that allows the user to install the system onto their computing device locally.

Generally, a computer, computer system, email device, computing device, client or server, as will be well understood by a person skilled in the art, includes one or more than one computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. It is the express intent of the inventors that a "processor" does not include a human; rather it is limited to be an electronic device, or devices, that perform digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

Multiple computers (also referred to as computer systems, computing devices, clients and servers) may be networked via a computer network, which may also be referred to as an electronic network or an electronic communications network. When they are relatively close together the network may be a local area network (LAN), for example, using Ethernet. When they are remotely located, the network may be a wide area network (WAN), such as the internet, that computers may connect to via a modem, or they may connect to through a LAN that they are directly connected to.

Computer-readable memory, which may also be referred to as a computer-readable medium or a computer-readable storage medium, which terms have identical (equivalent) meanings herein, can include any one or a combination of non-transitory, tangible memory elements, such as random access memory (RAM), which may be DRAM, SRAM, SDRAM, etc., and nonvolatile memory elements, such as a ROM, PROM, FPROM, OTP NVM, EPROM, EEPROM, hard disk drive, solid state disk, magnetic tape, CDROM, DVD, etc.) Memory may employ electronic, magnetic, optical, and/or other technologies, but excludes transitory propagating signals so that all references to computer-readable memory exclude transitory propagating signals. Memory may be distributed such that at least two components are remote from one another, but are still all accessible by one or more processors. A nonvolatile computer-readable memory refers to a computer-readable memory (and equivalent terms) that can retain information stored in the memory when it is not powered. A computer-readable memory is a physical, tangible object that is a composition of matter. The storage of data, which may be computer instructions, or software, in a computer-readable memory physically transforms that computer-readable memory by physically modifying it to store the data or software that can later be read and used to cause a processor to perform the functions specified by the software or to otherwise make the data available for use by the processor. In the case of software, the executable instructions are thereby tangibly embodied on the computer-readable memory. It is the express intent of the inventor that in any claim to a computer-readable memory, the computer-readable memory, being a physical object that has been transformed to record the elements recited as being stored thereon, is an essential element of the claim.

Software may include one or more separate computer programs configured to provide a sequence, or a plurality of sequences, of instructions to one or more processors to cause the processors to perform computations, control other devices, receive input, send output, etc.

It is intended that the invention includes computer-readable memory containing any or all of the software described herein. In particular, the invention includes such software stored on non-volatile computer-readable memory that may be used to distribute or sell embodiments of the invention or parts thereof.

It should be understood that the above-described embodiments of the present invention, particularly, any "preferred" embodiments, are only examples of implementations, merely set forth for a clear understanding of the principles of the invention. Many variations and modifications may be made to the above-described embodiment(s) of the invention as will be evident to those skilled in the art. That is, persons skilled in the art will appreciate and understand that such modifications and variations are, or will be, possible to utilize and carry out the teachings of the invention described herein.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are used to specify the presence of stated features, elements, integers, steps or components, and do not preclude, nor imply the necessity for, the presence or addition of one or more other features, elements, integers, steps, components or groups thereof.

The scope of the claims that follow is not limited by the embodiments set forth in the description. The claims should be given the broadest purposive construction consistent with the description and figures as a whole.

What is claimed is:

1. An email management system configured to electronically receive probable non-conforming emails (NCEs) from a plurality of enhanced email devices, each NCE having been determined by one of the enhanced email devices to probably not conform to a predefined set of rules, each NCE being provided in a reporting message containing a copy of the probable NCE, user-identifying information, and information specifying one or more reasons for probable non-conformance, the system comprising a computer processor configured to:
   maintain an NCE database storing a record for each of a plurality of probable NCEs, the record for each probable NCE comprising a copy of the probable NCE, and one or more digital signatures of the probable NCE;
   electronically receive the reporting messages from the plurality of enhanced email devices;
   for each probable NCE contained in one of the reporting messages:
      calculate one or more digital signatures of the probable NCE;
      determine by comparing the calculated signatures with the signatures stored in the NCE database whether the probable NCE is already stored in the NCE database;
      if the probable NCE is not stored in the NCE database, store the probable NCE and the one or more calculated signatures in the NCE database along with the user-identifying information and the information specifying one or more reasons for probable non-conformance contained in the reporting message;
      if the probable NCE is already stored in the NCE database, add the user-identifying information and the information specifying one or more reasons for probable non-conformance in the reporting message to the record for the probable NCE in the NCE database.

2. The system of claim 1, wherein the computer processor is further configured to analyze an NCE database record to determine whether each of the probable NCEs is a confirmed NCE that does not conform to the rules.

3. The system of claim 2, wherein the computer processor determines that the probable NCE is a confirmed NCE by calculating a score related to the probability that the probable NCE does not conform to the rules, and then the probable NCE is deemed to be a confirmed NCE if the score exceeds a pre-determined threshold.

4. The system of claim 3, wherein the score is calculated so that the score exceeds the pre-determined threshold if more than a pre-determined number of enhanced email devices reported the probable NCE with the same reason for probable non-conformance.

5. The system of claim 2, wherein the computer processor is further configured to, if the probable NCE is determined to be a confirmed NCE, prepare a package of information containing the reasons for probable non-conformance and specifying user-identifying information for each user whose enhanced email device reported the confirmed NCE to be a probable NCE.

6. The system of claim 5, wherein the computer processor is further configured to electronically transmit the package of information to a remote electronic device.

7. The system of claim 5, wherein the package of information further includes the score for each confirmed NCE.

8. The system of claim 1, wherein at least one of the digital signatures of each of the probable NCEs is the value of a hash function computed on a portion of the probable NCE.

9. The system of claim 8, wherein at least one of the digital signatures of each of the probable NCEs is the value of a hash function computed on the complete probable NCE other than message headers.

10. The system of claim 1, wherein the predefined set of rules are derived from legislation limiting the transmission of unsolicited commercial electronic messages so that sending an NCE represents an offence under the legislation.

11. The system of claim 5, wherein the computer processor is further configured to analyze a plurality of NCE database records to analyze, for each NCE database record, the probable NCE and the information specifying the reasons for probable non-conformance to determine whether the probable NCE is a confirmed NCE, and wherein the packages of information are electronically transmitted to a server.

12. The system of claim 5, wherein the package of information includes, for each user whose enhanced email device reported the confirmed NCE to be a probable NCE, an indication of whether the user is willing to participate in a class action lawsuit in relation to the confirmed NCE.

13. The system of claim 1, wherein each probable NCE contained in a reporting message includes all message headers.

14. A system for analyzing email for compliance with a predefined set of rules, the system comprising:
  a plurality of enhanced email devices, each enhanced email device being an email device comprising a computer processor configured to send and receive email, display email to a user, and receive input from the user, the computer processor of the enhanced email device being further configured to:
    determine whether an email message received by the email device probably conforms or does not conform to the rules; and
    if the email message is determined to probably not conform to the rules, designate the email message to be a probable non-conforming email (NCE), and electronically transmit a reporting message to an email management system, the reporting message containing a copy of the probable NCE, user-identifying information, and information specifying one or more reasons for probable non-conformance; and
  the email management system comprising a computer processor configured to:
    maintain an NCE database storing a record for each of a plurality of probable NCEs, the record for each probable NCE comprising a copy of the probable NCE, and one or more digital signatures of the probable NCE;
    electronically receive the reporting messages from the plurality of enhanced email devices; and
    for each probable NCE contained in one of the reporting messages:
      calculate one or more digital signatures of the probable NCE;
      determine by comparing the calculated signatures with the signatures stored in the NCE database whether the probable NCE is already stored in the NCE database;
      if the probable NCE is not stored in the NCE database, store the probable NCE and the one or more calculated signatures in the NCE database along with the user-identifying information and the information specifying one or more reasons for probable non-conformance contained in the reporting message; and
      if the probable NCE is already stored in the NCE database, add the user-identifying information and the information specifying one or more reasons for probable non-conformance in the reporting message to the record for the probable NCE in the NCE database.

* * * * *